United States Patent [19]

Berardo et al.

[11] Patent Number: 4,861,480

[45] Date of Patent: Aug. 29, 1989

[54] ORGANOMINERAL SEMIPERMEABLE MEMBRANE AND ITS PRODUCTION PROCESS

[75] Inventors: Michel Berardo, Roquemaure; Charles Darnez, Bordeaux-Cauderan; Jean-Marie Martinet, Montelimar; Gilbert Roche, Bourg Saint Andeol, all of France

[73] Assignee: Commissariat a l'Energie Atomique, Paris, France

[21] Appl. No.: 181,191

[22] Filed: Apr. 13, 1988

[30] Foreign Application Priority Data

Apr. 23, 1987 [FR] France ................................ 87 05748

[51] Int. Cl.$^4$ ............................................. B01C 13/00
[52] U.S. Cl. ................................. 210/490; 210/500.25; 210/500.26; 210/500.36; 210/500.42; 521/27
[58] Field of Search ................... 210/638, 500.26, 640, 210/500.42, 490, 496, 510, 500.25, 500.36; 427/244, 245, 246; 521/27

[56] References Cited

U.S. PATENT DOCUMENTS

| 276,993 | 1/1975 | Lee et al. ...................... 260/2.5 M |
| 4,067,805 | 1/1978 | Chiang et al. ................. 210/640 X |
| 4,137,137 | 1/1979 | Machi et al. ................... 204/159.16 |
| 4,595,707 | 6/1986 | McCreedy et al. ............. 521/62 |

FOREIGN PATENT DOCUMENTS

| 0068509 | 1/1983 | European Pat. Off. . |
| 0092840 | 11/1983 | European Pat. Off. . |
| 0139806 | 5/1985 | European Pat. Off. . |
| 0175668 | 3/1986 | European Pat. Off. . |
| 0183989 | 6/1986 | European Pat. Off. . |
| 0250327 | 12/1987 | European Pat. Off. . |
| 1937960 | 1/1970 | Fed. Rep. of Germany . |
| 2080241 | 11/1971 | France . |
| 2575398 | 7/1986 | France . |
| 8606294 | 4/1986 | PCT Int'l Appl. . |
| 1593127 | 7/1981 | United Kingdom . |
| 8601425 | 3/1986 | . |

Primary Examiner—Frank Spear
Attorney, Agent, or Firm—Pearne, Gordon, McCoy & Granger

[57] ABSTRACT

The invention relates to semipermeable organomineral membranes usable in reverse osmosis.

This organomineral semipermeable membrane comprises a porous inorganic material support coated with a vinylidene fluoride polymer or copolymer-based organic layer incorporating functional groups giving the membrane a permeability to water or other solvents.

The porous inorganic material support is preferably constituted by a macroporous substrate coated with a microporous layer, e.g. produced from a single or mixed metal oxide or hydroxide. The organic layer can be constituted by polyvinylidene fluoride grafted by an appropriate monomer, such as styrene incorporating functional groups giving it selective permeability, e.g. hydrophilic groups, such as sulphonic groups.

19 Claims, No Drawings

ORGANOMINERAL SEMIPERMEABLE MEMBRANE AND ITS PRODUCTION PROCESS

DESCRIPTION

The invention relates to the production of selective, semipermeable membranes, more particularly usable in reverse osmosis.

Membranes of reverse osmosis installations must not only be permeable and selective, but must also have a very considerable robustness with respect to mechanical, thermal and chemical stresses to which they are exposed during use.

Moreover, most separation processes by reverse osmosis require the use of very low weight membranes in order to obtain a high permeability and which must also be able to withstand the high pressures to which they are exposed, particularly in the case of treating highly concentrated solutions.

Hitherto reverse osmosis membranes have generally been made from an organic material, e.g. polymethyl methacrylate and as described in U.S. Pat. No. 4 439 322. However, the use of organic membranes is limited to reverse osmosis processes not requiring treatments at high temperature or in an aggressive medium, such as is e.g. the case for the vapour sterilization of reverse osmosis circuits for use in agroalimentary industries.

The invention specifically relates to semipermeable membranes having good permeability and porosity characteristics, whilst also having a good mechanical strength and a good stability at temperatures above 100° C.

According to the invention these objectives are achieved by using an organomineral semipermeable membrane comprising an inorganic material porous support coated with a dense semipermeable organic layer based on vinylidene fluoride polymer or copolymer having functional groups giving the membrane a selective permeability with respect to water or other solvents.

The polymer used in the invention is a vinylidene fluoride homopolymer or copolymer and in the latter case the copolymer generally contains at least 95% vinylidene fluoride. According to the invention, it is sometimes also possible to use vinylidine fluoride copolymers containing less than 95% vinylidene fluoride.

In the inventive organomineral membrane structure, the inorganic material porous support generally having an average pore size of 0.1 to 20 μm and preferably 0.2 to 10 μm gives the membrane a high mechanical strength, which makes it possible to use dense organic semipermeable layer having a very limited thickness and also a high permeability. Advantageously, the organic layer thickness is 0.01 to 1 μm.

The inorganic material porous support can be made from different materials, e.g. from an oxide, such as alumina, from a metal such as nickel, from silicon carbide or carbon. It can be in the form of a plate, tube, modular element having channels or in any other form appropriate for the use for which it is intended.

Although such homogeneous porous supports are satisfactory, preference is generally given to the use of a composite porous support in order to obtain the desired mechanical characteristics, particularly a resistance to stresses exceeding 10 MPa, whilst being able to associate therewith a very thin organic layer. In this case, the inorganic material porous support comprises an inorganic material macroporous substrate coated by an inorganic material microporous layer. This makes it possible to obtain on the surface of the porous support to be covered with the organic layer, pores having very small dimensions and e.g. an average pore radius below 10 nm. Thus, it is possible to improve the adhesion and mechanical strength of the organic layer deposited on the porous support.

In this preferred realization of the porous support, the macroporous substrate can be of an inorganic material chosen from within the group including metal oxides, such as alumina, metals, metallic carbides, silicon carbide and carbon and the microporous layer can be made from a single or mixed, metal hydroxide or oxide. In general, these oxides or hydroxides are formed from metals, such as aluminium, zirconium, titanium and silicon. For example, it is possible to use alumina or aluminium spinels.

In the organomineral membrane according to the invention, the properties of the vinylidene fluoride copolymer or polymer-based organic layer are improved by using a polymer or copolymer carrying functional groups. This can be obtained by producing the membrane with a polymer or copolymer having grafted macromolecular chains carrying functional groups giving the membrane a selective permeability with respect to water or other solvents, e.g. hydrophilic functional grops in order to make it permeable to water.

These macromolecular chains can be produced by grafting ethylenically unsaturated monomers incorporating functional groups. It is also possible to functionalize the macromolecular chains after grafting by fixing functional groups thereto, e.g. sulphonic groups, in order to make the organic layer hydrophilic.

According to the invention, it is possible to produce an organomineral membrane having functional groups without using a grafted polymer or copolymer. In this case, the organic layer is constituted by a vinylidene fluoride copolymer having functional groups giving the membrane a selective permeability with respect to water or other solvents, e.g. a vinylidene fluoride copolymer and a monomer incorporating such groups.

The copolymer incorporating these functional groups can be directly obtained by choosing for the production of the copolymer a monomer having functional groups, e.g. a hydrophilic monomer, such as acrylic acid, methacrylic acid, hydroxyethyl methyl acrylate and vinylbenzene acid. It is also possible to firstly prepare a vinylidene fluoride copolymer and a monomer which can be functionalized, following by the introduction of the functional groups onto the copolymer, e.g. involving the copolymerization of the vinylidene fluoride and styrene and then subjecting the thus obtained copolymer to a chlorosulphonation treatment.

The invention relates to a process for producing an organomineral membrane having the aforementioned characteristics.

This process consists of contacting one of the faces of an inorganic material porous support with a solution or suspension of a vinylidene fluoride polymer or copolymer in order to deposit on said face of the porous support a solution of suspension layer, followed by the drying of the solution or suspension layer deposited in this way in order to form on said face of the porous support a vinylidene fluoride polymer or copolymer-based organic layer, grafting onto the polymer or copolymer organic layer at least one monomer having at least one ethylenically unsaturated function and then subjecting the grafted polymer organic layer to a functionalization treatment in order to introduce onto the grafted chains functional groups giving the layer a selective permeability with respect to water or other solvents.

As has been shown hereinbefore, the porous support is advantageously constituted by a porous substrate coated with a microporous inorganic layer in order to facilitate the deposition of a very thin vinylidene fluoride polymer or copolymer layer. This composite porous support can be produced by conventional processes. Thus, when the microporous layer is a single or mixed metal oxide, e.g. alumina or aluminium spinel, it is possible to deposit said microporous layer on an inorganic macroporous support by using the processes described in French patents FR-A-2 550 953, FR-A-2 575 495 and FR-A-2 575 396. These processes in particular make it possible to deposit very permeable, ceramic microporous layers of limited thickness, e.g. below 1 $\mu$m, having regular and well distributed pores and whereof the mean pore radius can be 2 nm. The use of such a texture on the face of a porous support which is to be coated by the halocarbon polymer layer thus makes it possible to produce extremely thin organic coverings, e.g. with a thickness below 0.1 $\mu$m, which are mechanically highly resistant to the pressure stresses currently applied in reverse osmosis separation processes.

Thus, the stress undergone by an organic film fixed to the orifice of a pore varies essentially in the same way as the ratio of said pore radius to the film thickness. Thus, it is not possible to reduce the thickness of the film without increasing the mechanical stress undergone by it, except on at the same time reducing in the same proportion the size of the underlying pores. Thus, according to the invention, the use of an inorganic microporous layer having the given characteristics and in particular a mean pore radius of less than 10 nm, makes it possible to reduce, without any risk of cracking, the thickness of the vinylidene fluoride polymer or copolymer organic layer to a few hundredths of a micrometer and to consequently significantly increase its permeability.

Thus, commercial vinylidene fluoride films with a thickness of 25 to 50 $\mu$m functionalized by radiografting have a permeability not exceeding 10 to 20 $l/j.m^2$, whereas layers functionalized according to the invention have much higher permeability levels exceeding 100 to 200 $l/j.m^2$.

It is difficult to deposit such a thin, high quality layer on a macroporous substrate due to its excessive roughness, because there is a risk of local defects. However, when the macroporous substrate is coated with an inorganic microporous layer with the characteristics defined hereinbefore, i.e. a very limited surface roughness, it is possible to obviate such risks of defects.

As can be shown herebefore, these layers must have a very small mean pore radius in order to better support the thin layer and enable it to resist the pressure stresses occurring in a reverse osmosis process.

The deposition of an organic film from a polymer solution is necessarily accompanied by a penetration of the solution and therefore the polymer into the porosity of said microporous mineral underlayer due to capillary forces (whose effects are increased in the case of micropores: Jurin's law).

However, a polymer penetration into said microporosity is prejudicial, it reduces the permeability and also at the at the time of hydrating the membrane, the passage of water into the polymer matrix is accompanied by swelling, which can lead to local cracking of the microporous finish and therefore to deterioration of the membrane.

It is therefore desirable to neutralize the capillary action of the microporosity of the underlayer in order to prevent any penetration of polymers into the pores and this can be carried out by temporarily blocking these pores by a soluble product, which can be eliminated once the organomineral membranes has been prepared.

As a result of all these points (deposition of a rigid microporous mineral underlayer, temporary neutralization of its porosity) that the deposited organic film can have an extremely small thickness (and hence a high permeability), whilst retaining a high mechanical strength indispensable for reverse osmosis and also a satisfactory quality (absence of defects).

A limited thickness is also advantageous, because it makes it possible to reduce the effects of "compaction" of the film under the influence of the pressure (a thin film is compressed less than a thick film), so that more stable performances are maintained over a period of time.

According to the invention, the contacting of theporous support with the polymer or copolymer solution or suspension can be performed by any conventional means. It is in particular possible to use the engobing method which, in the case of a tubular porous support, can consist of linking the interior of the tubular porous support with a tank containing the halocarbon polymer solution or suspension. The tank is equipped with a deformable membrane which, under the influence of the pressure of a fluid, makes it possible to produce volume variations within the tank, which leads to the solution or suspension rising or falling within the porous tubular support.

The liquid used as the liquid medium of the solution or suspension is chosen in such a way as to obtain a semipermeable organic layer, which only very slightly penetrates the pores of the inorganic porous support. Thus, the rheological, surface properties of the suspension or solution condition the capillary attraction of the liquid by the open pores of the porous support and this phenomenon is responsible for the formation of the layer. However, one of the difficulties encountered when producing such a deposit on a porous support is the possibility of the polymer or copolymer penetrating the internal porosity of the inorganic porous support, which is prejudicial to the permeability of the membrane.

In order to reduce this penetration into the porous support, it is possible to appropriately modify the wettability of the walls of the pores of the inorganic porous support, e.g. by the prior impregnation of said porous support using a surfactant. It is also possible to limit the capillary attraction of the pores of the inorganic porous support with respect to the liquid of the solution or suspension by temporarily reducing the accessible porous volume of the porous support by introducing a controlled amount of an appropriate solvent, such as dimethyl formamide or water. This method also makes it possible to limit the thickness of the halocarbon polynmer layer to a very small value, which can be less than 1/10 $\mu$m.

According to a variant, in order to prevent said penetration of the polymer layer into the poes of the inorganic porous support, the first stage is to block the surface porosity of the inorganic porous support using a product which could then be eliminated by dissolving in an appropriate solvent, following deposition and drying of the polymer layer. This product can in particular be a hydrosoluble mineral salt, e.g. sodium chloride.

Following the deposition on the porous support of the polymer or copolymer solution or suspension layer, the latter undergoes drying, which can be performed at ambient temperature and can be completed by heat treatment performed at a temperature below the polymer softening point. Generally, in the case of polyvinylidene fluoride, the temperatures used for this heat treatment are in the range 100° to 150° C. and the treatment can last between 30 and 60 minutes.

When the organic layer is constituted by a polymer or copolymer modified by grafting, grafting can be performed either prior to the deposition of the organic layer, or after the deposition of the polymer or copolymer organic layer. Preferably, grafting takes place radiochemically using ionizing rays and the monomers used are monomers having at least one ethylenically unsaturated function.

The ionizing rays which can be used are ultraviolet, beta, gamma and X-rays, as well as accelerated electron beams. In general, use is made of gamma rays from a cobalt 60 source and radiation doses in the range 50 Krad to 5 Mrad.

The monomers used are preferably chosen from the group including acrylamide, acrylamine, styrene, divinylbenzene, vinylpyridines, N-vinylpyrrolidone, N-vinylcaprolactone, unsaturated acids, such as vinylacetic, vinylsulphonic and acrylic acids, unsaturated acid esters, allyl ethers, such as allyl glycidyl ether and their derivatives.

When grafting is performed radiochemically following the deposition of the organic layer, it is possible to produce the latter by subjecting the polymer or copolymer layer-coated support to irradiation by means of ionizing rays and contacting the thus irradiated organic layer with the monomers to be grafted, either during, or after irradiation.

In order to meet particular constraints, e.g. of a technological nature, grafting can be limited to certain zones by interposing, during the irradiation phase, absorbing shields or screens (e.g. of lead) having an appropriate shape and thickness on the parts to be reserved.

The prior irradiation of the organic layer has the effect of creating reactive sites within the matrix of the deposited polymer. When said irradiated layer is then brought into contact with the monomers to be grafted in the pure state or in solution in a solvent, e.g. by immersing the irradiated organic layer in a solution of monomers in an organic solvent or in a mixture of appropriate organic solvents, a grafting of the monomers takes place on the reactive sites of the polymer matrix.

It is possible to simultaneously graft several different monomers or successively graft several different monomers. It is also possible to use as grafting monomers, monomers having several ethylenically unsaturated functions, which makes it possible to ensure a partial crosslinking of the polyvinylidene fluoride layer.

Grafting can also be carried out by depositing on the inorganic porous support, a polymer or copolymer solution or suspension layer containing the monomers to be grafted and then subjecting the thus deposited layer to irradiation by means of ionizing rays in order to graft the monomers on the polymer and simultaneously bring about a partial crosslinking of the layer, which gives the film a good mechanical strength.

In certain cases, after grafting monomers onto the polymer layer, the latter is modified by a suitable functionalization treatment making it possible to fix on the grafted monomers functional groups, e.g. sulphonic groups, which give the organomineral membrane the desired permeability, e.g. a permeability to water.

When the grafting monomer is styrene, the treatment can consist of a chlorosulphonation, which can be performed by reacting the styrene units fixed to the polymer matrix with chlorosulphonic acid or an organic sulphur trioxide complex, following the rior swelling of the grafted polymer layer in a solvent, such a carbon tetrachloride or dichloromethane.

It is also possible to obtain a grafted polymer or copolymer layer containing appropriate functional groups without performing said complimentary treatment, by choosing for the grafting operation monomers containing appropriate functional groups, e.g. sulphonic, carboxylic, amine or amide groups.

According to the invention, the grafting and functionalization of the polymer or copolymer can also be performed prior to the deposition of the layer on the porous support. In this case, the polymer or copolymer is firstly modified by grafting appropriate monomers, optionally followed by a functionalization of the grafted chains. The thus modified polymer is then dissolved or suspended in an appropriate solvent and then, as hereinbefore, on the basis of said solution or suspension deposition takes place on the porous support, followed by the drying of the thus modified organic polymer layer.

In this final embodiment of the inventive process, it is possible to directly obtain functionalization during grafting by choosing monomers incorporating appropriate functional groups, such as e.g. the case with acrylic acid and hydroxyethyl methyl acrylate.

It is also possible to obtain this functionalization in two stages by grafting a monomer which can be functionalized and then subjecting the grafted polymer to a functionalization treatment.

As hereinbefore, grafting can be brought about radiochemically by using ethylenically unsaturated monomers, such as those referred to hereinbefore.

Other features and advantages of the invention can be better gathered from reading the following illustrative and non-limitative examples.

EXAMPLE 1

Preparation of an Organomineral Alumina Membrane Covered with a Polyvinylidene Fluoride Layer Grafted by Chlorosulphonated Styrene The porous inorganic material support is firstly prepared by depositing an aluminium hydroxide layer on the inner surface of a diameter 7 mm porous tubular alumina substrate, previously coated with a ceramic finish and having mean pore radius of 0.8 $\mu$m. The aluminium hydroxide layer is deposited by engobing using a colloidal aluminium hydroxide suspension to which is added the polyvinyl alcohol in order to obtain a viscosity of 25 cp. The aluminium hydroxide layer deposited in this way is then slowly dried and subjected to a heat treatment at 700° C. for 45 minutes. This gives a microporous alumina layer with a thickness of 1 $\mu$m and a mean pore radius of 6.5 nm.

On said alumina layer is then deposited by engobing a polyvinylidene fluoride layer using a polyvinylidene fluoride solution (PVDF) in dimethylacetamide having a PVDF concentration of 1%. The deposited layer is then slowly dried and then subjected to a heat treatment at 130° C. for 2 hours. This gives an organic polyvinylidene fluoride layer with a thickness of 1 μm.

The thus coated tubular support is then exposed to the action of gamma radiation from a cobalt 60 source under the following conditions:
dose rate: 50 krad/h,
mean dose: 500 krad.

After irradiation, the tubular support is fitted in a circuit traversed by a deaerated styrene flow and the styrene is circulated in contact with the support for 2 h. The styrene flow is then interrupted and it is replaced by a 10% by volume chlorosulphonic acid solution in carbon tetrachloride or methyl chloride, which is circulated at ambient temperature for one hour.

The grafting rate of the styrene expressed in % by weight, i.e. according to the formula:

$$\frac{P_1 - P_0}{P_0} \times 100$$

with $P_1$ representing the weight of the support after grafting and $P_0$ the weight of the support before grafting, reaches 10%. The quantity of chlorosulphonic groups fixed to the polyvinylidene fluorine is 6% of the fluorine polymer.

The thus obtained membrane is then used in a reverse osmosis installation, where the solution to be treated is an aqueous solution containing 3% by weight of sodium chloride. Before fitting the membrane in the installation, the latter undergoes a swelling treatment in hot water and then reverse osmosis is carried out by circulating the solution within tubes under a pressure of 4 MPa. Under these conditions, the retention capacity of the membrane is 94% and the permeate flow rate is 65 $l.d^{-1}.m^{-2}$.

EXAMPLE 2

Preparation of an Organomineral Alumina Membrane Covered with a Polyvinylidene Fluoride Layer Grafted by Chlorosulphonated Styrene Use is made of the same porous tubular surface as in example 1 and on the inner surface thereof is deposited an aluminium hydroxide layer using the engobing method, as in example 1. The aluminium hydroxide layer is then slowly dried and then undergoes a heat treatment at 600° C. for 45 minutes. This gives a microporous alumina layer with a thickness of 1 μm and a mean pore radius of 4.5 nm.

Prior to the deposition of the polyvinylidene fluoride on said alumina layer, the porous substrate is impregnated with dimethyl formamide in order to assist the deposition of polyvinylidene fluoride on the outer surface of the alumina layer. This is followed by the deposition of the polyvinylidene fluoride layer by contacting for one minute the inner surface of the tubular substrate coated with the microporous alumina layer with a polyvinylidene fluoride solution in dimethyl formamide or dimethyl acetamide having a polyvinylidene fluoride concentration of 0.3%. This is followed by the slow drying of the deposited layer, which then undergoes a heat treatment at 130° C. for 2 hours. This gives an organic polyvinylidene fluoride layer with a thickness of 0.2 μm.

The thus coated tubular support is then exposed to the action of gamma rays from a cobalt 60 source under the following conditions:
dose rate: 50 krad/h,
mean dose: 1 Mrad.

Following irradiation, the styrene is grafted on the thus treated tubular support, followed by a sulphonation treatment under the same conditions as in example 1. This gives a styrene grafting rate of 6% by weight and the quantity of chlorosulphonic groups is 4%.

The thus obtained membrane is conditioned in hot water and is then used in a reverse osmosis installation for treating an aqueous solution with a 3% by weight salt concentration. The solution is circulated within tubes under a pressure of 4 MPa and under these conditions the retention rate is 91% for a permeate flow rate of 95 $l.d^{-1}.m^{-2}$.

EXAMPLE 3

Preparation of an Organomineral Membrane of an Alumina Substrate Supporting a Microporous Zirconia Layer, Itself Covered by a Polyvinylidene Fluoride Coating Grafted by Chlorosulphonated Styrene The same alumina tubular substrate as in example 1 is used and on the inner surface thereof is deposited a zirconium hydroxide layer using the engobing method as in example 1, but applied here to a colloidal zirconium hydroxide suspension to which has been added polyvinyl alcohol in order to obtain a viscosity of 20 cp. This is followed by slow drying and then a heat treatment at 650° C. for 2 hours. This gives a microporous zirconia layer with a thickness of 2 μm and a pore radius of 9 nm.

The thus obtained zirconia layer is impregnated with an aqueous 25% by weight sodium chloride solution. After slow drying and then washing with a small volume of methanol, the PVDF layer is deposited by contacting the zirconia layer with a 0.5% by weight polyvinylidene fluoride solution in a mixture of dimethyl formamide and acetone.

The thus deposited organic layer is dried and then subjected to a heat treatment at 130° C. for 2 hours. A polyvinylidene fluoride coating is obtained with a thickness of 0.3 μm.

This is followed by irradiation with gamma rays and then styrene grafting, followed by sulphonation treatment as described in example 1.

The membrane obtained is conditioned in hot water and then placed in a reverse osmosis circuit for treating an aqueous solution having a 3% salt concentration. Under a pressure of 4 MPa, the retention rate is 90% for a permeate flow rate of 130 $l.d^{-1}.m^{-2}$.

Although in these examples a description has been given of the use of the inventive membranes for the treatment of aqueous solutions by reverse osmosis, it is obvious that the inventive membranes can be used for the treatment of other solutions provided that onto the same are grafted monomers giving them a selective permeability with respect to the solvent of the solution or functionalizing them with appropriate groups giving them said selective permeability.

We claim:

1. Organomineral semipermeable membrane, characterized in that it comprises a porous inorganic material support coated with a dense semipermeable organic layer comprising a vinylidene fluoride polymer or copolymer having functional groups giving the membrane a selective permeability with respect to water or other solvents, the porous support comprising a macroporous inorganic material substrate coated with a microporous inorganic material layer having a thickness of from about 1 to about 2 μm.

2. Membrane according to claim 1, characterized in that the organic layer has a thickness of 0.01 to 1 μm.

3. Membrane according to either of the claims 1 and 2, characterized in that the porous support has a mean pore size of 0.1 to 20 μm.

4. Membrane according to either of the claims 1 and 2, characterized in that the organic layer has an average pore radius size of less than about 10 nm.

5. Membrane according to claim 4, characterized in that the macroporous substrate is of an inorganic material chosen from the group including metal oxides, metals, metal carbides, silicon carbides and carbon and in that the microporous layer is of a single or mixed metal hydroxide or oxide.

6. Membrane according to claim 1, characterized in that the vinylidene fluoride polymer or copolymer has grafted macromolecular chains carrying said functional groups.

7. Membrane according to claim 6, characterized in that the organic layer is constituted by vinylidene fluoride polymer or copolymer grafted by styrene incorporating chlorosulphonic or sulphonated groups.

8. Membrane according to claim 1, characterized in that the organic layer is constituted by a vinylidene fluoride copolymer carrying functional groups giving the membrane a selective permeability with respect to water or other solvents.

9. Process for the preparation of a dense organomineral semipermeable membrane having functional groups, characterized in that it comprises coating one of the faces of a macroporous inorganic material substrate with a microporous inorganic material to form a porous support face including a layer of said microporous inorganic material having a thickness of from about 1 to about 2 μm, contacting said porous support face with a vinylidene fluoride polymer or copolymer solution or suspension for depositing on said porous support face a layer of the solution or suspension, drying the thus deposited layer of solution or suspension in order to form on said porous support face an organic vinylidene fluoride polymer or copolymer-based layer, grafting onto the polymer or copolymer organic layer at least one monomer incorporating at least one ethylenically unsaturated function and then subjecting the organic grafted polymer layer to a functionalization treatment for introducing onto the grafted chains functional groups giving the layer a selective permeability with respect to water or other solvents.

10. Process according to claim 9, characterized in that the monomer is chosen in the group including acrylamide, acrylamine, styrene, divinylbenzene, vinylpyridines, N-vinylpyrrolidone, N-vinylcaprolactone, vinyl acetic acid, vinylsulphonic acid, acrylic acid, allyl ethers and their derivatives.

11. Process according to either of the claims 9 and 10, characterized in that grafting is carried out radiochemically.

12. Process according to claim 11, characterized in that grafting is carried out by subjecting the coated support of the polymer or copolymer layer to irradiation by means of ionizing rays and by contacting the thus irradiated organic layer with the monomers to be grafted either during, or after irradiation.

13. Process according to claim 11, characterized in that on the inorganic porous support is deposited a polymer or copolymer suspension or solution layer containing the monomers to be grafted and in that the thus deposited layer then undergoes irradiation by means of ionizing rays in order to graft the monomers onto the polymer or copolymer and simultaneously bring about a partial crosslinking of the layer.

14. Process according to claim 9, characterized in that the grafting monomer is styrene, so that the functionalization treatment is a chlorosulphonation treatment.

15. Process for the preparation of a dense organomineral semipermeable membrane incorporating functional groups, characterized in that it comprises coating one of the faces of a macroporous inorganic material substrate with a microporous inorganic material to form a porous support face including a layer of said microporous inorganic material having a thickness of from about 1 to about 2 μm, contacting said porous support face with a vinylidene fluoride polymer or copolymer solution of suspension incorporating functional groups for depositing on said face of the porous support a layer of the solution or suspension, drying and thus deposited layer of solution or suspension to form on said face of the porous support a vinylidene fluoride polymer or copolymer-based organic layer incorporating functional groups giving the layer a selective permeability with respect to water or other solvents.

16. Process according to claim 15, characterized in that the polymer or copolymer incorporating the functional groups is obtained by grafting a monomer having the functional groups.

17. Process according to claim 15, characterized in that the polymer or copolymer having the functional groups is obtained by grafting on a vinylidene fluoride polymer or copolymer a monomer which can be functionalized and then subjecting the thus obtained grafted polymer or copolymer to a treatment, in order to introduce the functional groups onto the grafted monomer.

18. Process according to claim 15, characterized in that the copolymer incorporating the functional groups is a copolymer of vinylidene fluoride and a monomer incorporating functional groups.

19. Process according to either of the claims 9 and 15, characterized in that, prior to contacting the porous support face with the polymer or copolymer solution or suspension, the porous support face is contacted with either a solvent or a surfactant for the solution or suspension to reduce the penetration thereof into the internal porosity of the porous support.

* * * * *